UNITED STATES PATENT OFFICE.

CHARLES C. MOORE, OF WASHINGTON, DISTRICT OF COLUMBIA, ASSIGNOR OF ONE-HALF TO FREDERICK C. STEVENS.

MANUFACTURE OF STARCH.

1,156,801.  Specification of Letters Patent.  Patented Oct. 12, 1915.

No Drawing.   Application filed January 20, 1913.  Serial No. 743,066.

*To all whom it may concern:*

Be it known that I, CHARLES C. MOORE, a citizen of the United States, residing at Washington, in the District of Columbia, have invented certain new and useful Improvements in the Manufacture of Starch, of which the following is a specification.

This invention relates to the manufacture of starch; and it comprises a method wherein succulent starchy vegetable materials in their natural condition are dried or desiccated, usually after a suitable preliminary comminution or subdivision, are then ground while dry to the desired degree of fineness, and are thereafter treated by wet methods to obtain starch milk and to recover starch therefrom; all as more fully hereinafter set forth and as claimed.

In the manufacture of starch from cassava, yams and other suitable starch-yielding roots and tubers it is a frequent practice to grind the material in its natural state, with or without previous comminution, with water, screening to remove fiber and the like, to obtain a starch milk which is treated on starch tables to recover starch, the effluent waste water being generally allowed to run to waste. More rarely, centrifugals are used in lieu of starch tables. In either way, however, it is found that the amount of starch recovered falls much below the amount found in the materials by analysis. Potatoes containing 20 per cent. actual starch by analysis rarely give by the usual methods more than 18 to 19 per cent. of commercial starch (of 20 per cent. moisture content) or about 15 per cent. actual starch. The loss is largely due to the inclusion or holding of starch in vegetable cells which may not have been ruptured by the wet grinding, it being difficult to attain in wet grinding any complete comminution of all the cells since the cellular structure in its natural or moist condition is of a more or less corky or spongy consistency. Another part of the loss is due to the fact that not all of the starch in succulent vegetable materials, such as cassava, sweet potatoes, artichokes, ordinary or "Irish" potatoes, yams, etc, is in a ripened mature and heavy condition. Starch separation in commercial methods, as on the starch tables, depends mainly on a difference in specific gravity which causes the heavier starch to sink in a current of water where other insoluble components of the vegetable material will swim or remain suspended. And the unripened, immature forms of starch granules are in a more or less hydrated condition in which their specific gravity is less than that of the ripe starch, so that they do not sink and separate as readily.

I have discovered that I can materially increase the yield of starch obtainable from succulent vegetable starch-yielding materials by intercalating a drying or desiccating step between the primary and the final comminution, where two comminutions are advisable; or, where the preliminary or rough comminution is omitted, by drying or desiccating the materials as they occur naturally and then fine grinding in a dry condition to a meal or flour from which starch is subsequently obtained by wet methods. Ordinarily it is more advantageous to comminute in two stages, giving the raw material only such preliminary comminution as may be necessary for quick drying and performing a fine grinding upon the dried or desiccated material. The drying or desiccation renders brittle and frangible the walls of the cells containing the starch granules, and fine grinding under these conditions is much more effective in breaking down the cells and freeing the starch granules than is wet grinding. After the final dry grinding step, a wet grinding may further be employed; but here more for the purpose of freeing the loosened starch that may adhere to the ruptured fibers than for the sake of comminution. The starch milk obtained from the dry-ground fine material may be treated as usual upon the starch tables or in starch centrifugals as may be desired.

The method is particularly useful with farinaceous vegetable materials of a succulent nature, such as those hereinbefore specified, since they are not only difficult to wet-grind to any degree of fineness but also carry more of the immature light varieties of starch than do grain and the like.

In a typical embodiment of the present invention I may take such succulent vegetable starch-yielding materials as cassava, potatoes, yams, etc., in their natural moist state and coarse-grind, grate, chip, slice or otherwise comminute the tubers to facilitate rapid drying. Since the ultimate object is to make commercial starch, drying must of course be under non-gelatinizing conditions and for this reason the comminution should be sufficient to produce relatively small, quick-drying particles. After comminution, drying or disiccating is performed, using for this purpose any of the ordinary means or apparatus, such as rotary drums, belt driers, kilns, etc. Sun drying, for reasons later set forth, is less well adapted unless certain precautions be adopted. Whatever the means employed, disiccation should be carried to a stage where the material loses as much as possible of the toughness inherent in partially dried succulent vegetable materials. In other words the materials are best dried until they are brittle or frangible, the walls of the cells inclosing the starch granules being then in a condition such that they are easily shattered in the subsequent dry grinding. Drying of course must be at a temperature (of the material) below that at which starch will cook, convert, hydrolyze or become gelatinized. Temperatures about or below 120° F. are well adapted for this part of the process, although temperatures as high as about 140° F. may often be successfully employed. In the first stages of drying, air of a temperature in excess of this may be used as the rapid evolution of vapors keeps the material itself at a lower temperature.

After drying or desiccating, the material is next to be fine ground while dry. Any suitable mills or grinding apparatus may be employed. A bur stone grinder is well suited for this purpose. The degree of fineness necessary will depend somewhat on the coarseness of texture of the material being treated. It is best that the grinding should be carried to a degree sufficient to rupture substantially all the cells inclosing starch granules; and this can be readily accomplished with material properly dried as above described. With cassava a dry grinding to 80 mesh will give a product from which a much larger yield of starch is possible than by the ordinary wet grinding processes; but 100 mesh is better, and the fineness may advantageously be still greater. With 100 mesh grinding however I can recover up to 95 per cent. of the actual starch shown to be present in cassava by analysis.

If the material is not ground so fine as just described it is ordinarily necessary to use a further steeping operation, in which fermentation to some extent may take place, to rupture or loosen starch-inclosing cells prior to the operation of forming starch milk. Therefore dry grinding, as fine as may be, is better. Furthermore, fermentation and steeping operations are apt to injure the starch granules more or less and to lighten them by absorption of water. But even where the dry-ground material is relatively coarse, the results obtained are considerably better than with the wet grinding methods employed heretofore with succulent vegetable matter. The dry grinding, even though not to excessive fineness, has ruptured the starch cells so much more efficiently that the steeping need not be so long as is usually necessary.

With most dry fine ground materials of the class described, starch milk can be directly obtained without the deleterious results attending steeping. Upon the addition of water to the flour or fine meal, the finely ground pieces of fiber and cell walls that are the result of the fine grinding treatment, swell almost immediately to many times their size, while the starch granules themselves are scarcely swelled at all. This, of course makes separation by screening very rapid and effective.

The fine dry-ground material is treated with water and the resulting starch magma screened to give a starch milk the swollen fragments of fiber and non-starchy tissue being retained by the screen or sieve. From the starch milk thus obtained, starch is recovered in any convenient way, as on the starch tables or in centrifugals. In obtaining the starch milk it is advantageous to again grind the fine dry-ground material with water, though more for the purpose of perfecting the admixture and the mutual separation of starch granules and cellular matter (or "gluten") than for any comminution.

In the drying operation the "green" or immature hydrated starch particles are dehydrated and converted into dense forms readily recoverable on the tables. In the fine dry-grinding substantially all the starch-containing cells are ruptured and their starch is freed and made available for recovery from the starch milk. In treating the dried material with water the cellular material swells and the starch does not. It is one of the advantages of this process that the time of contact of starch and water is minimized.

A number of other advantages are incident to, or may be secured by, the described process. With dry, very fine material the amount of water necessary to wash the starch from the fibrous matter in obtaining the starch milk is much diminished and concomitantly the concentration of the waste effluent from the starch tables is much increased, rendering more practicable commercially its concentration for food purposes, either as cattle food or human food. In practice I have found it desirable in some cases, and especially when operating on potatoes, to subject the finely ground dried product to a short preliminary steeping process, prior to making starch milk and washing the product on sieves. This steep liquor may be drawn off, and concentrated, or it may pass into the water used in making starch milk and separating the starch. Since the steep liquor represents practically all that is in the material, save the starch which has been abstracted and removed, the concentrated product represents a concentrated nitrogenous material. It may be employed as a cattle food or as a raw material for producing articles intended for human consumption. The steep liquor or the effluent from the tables, or both together, may be directly evaporated down in suitable evaporating apparatus, or may be strained, filtered or filter-pressed to recover insoluble matters, the clear liquid concentrated to a syrup, united with the insoluble matters and the assemblage dried.

Cassava, potatoes, like many other succulent vegetable materials, contain a plurality of enzyms having functions in the vital operations of the tissues. Upon cutting or disintegrating of the material these enzyms operate in various ways upon the various substances present. These actions are deleterious to the character of material for starch making purposes and in drying in the present invention it is desirable that the drying be hastened as much as possible to cut short enzymic action. The drying must of course not be at a temperature sufficient to convert, "gelatinize" or hydrolyze starch. Any hydrolyzed or converted starch cannot well be recovered on the starch tables; neither is it a desirable component of commercial starch. Drying should therefore be at low temperature and as quick as possible, but these temperatures are favorable to the action of most of these enzyms.

Among the enzyms are bodies which tend to cause absorption of oxygen from the atmosphere with browning or blackening of the tissues and contained starch. This discoloration is much facilitated by the presence of iron which is inevitably dissolved from cutting tools in comminution of the tubers. Diastatic enzyms capable of acting on starch are always present. For the foregoing reasons it is very advantageous to treat the material during or shortly after the first comminution with a body or substance having the power of arresting enzymic activity. While many other substances, such as alkaline carbonates and hydrates in dilute solution, lime, various acids, such as sulfuric acid, etc., may be employed, I find that a sufficient degree of activity coupled with certain other desirable effects for this purpose is possessed by the bisulfites. Bisulfite of soda is particularly advantageous. Bisulfite of soda or bisulfite of lime may be employed, being sprinkled in the solid or dissolved form over the material during or immediately after the comminution. Very little bisulfite is needed for the present purposes, as little as one pound of sodium bisulfite being all that is necessary for 400 or 500 pounds of material. The bisulfites have the further advantage for the present purpose that in addition to their enzym-arresting power they also restrain fermentation by organisms, preventing souring by the formation of lactic acid, alcoholic fermentation and the like. This is particularly desirable where, for any reason, the period of drying is long. With the aid of bisulfite, the materials may be air dried at common temperatures if desired without suffering deterioration. If the material is allowed to brown or blacken in drying to any extent the starch recovered will be off-color and less in quantity.

The bisulfites, for the present purposes, have a further advantage in that they appear to facilitate the conversion of the immature forms of starch into the heavy, easily recoverable mature forms, thereby increasing the yield of commercial starch. The hydrated immature forms of starch in the presence of bisulfites do not dry down to give horny converted products. These actions are probably due to the power of bisulfites of combining with aldehydic and ketonic bodies. The carbohydrates contain aldehyde or ketone groups.

In the starch making operation the presence of a slight amount of bisulfite is quite desirable since it prevents fermentation and souring occurring. The presence of sulfite or bisulfites in the small amount used is immaterial as regards the composition of the waste water effluent of the tables or from a steeping operation where such effluent is to be concentrated and used as a cattle food. Should its removal however be desirable, this can be easily effected by acidulating the liquid slightly during concentration, as by acidulating it by a little hydrochloric acid. Using sodium bisulfite, this results in the formation of a little common salt (sodium chlorid) with liberation of sulfur dioxid as as a gas. Or a portion of starch milk may be allowed to sour slightly with formation of lactic acid, and this sour liquid may be added to the effluent from the starch table before or during concentration. The lactic acid will expel the sulfur dioxid.

In an advantageous form of the present invention, I take cassava tubers or potatoes and comminute them in any suitable way, as by chopping, grating, slicing, etc. The comminuted material emerging from the machine used may be sprinkled with the sodium or calcium bisulfite, and may thereafter be dried in any suitable manner. In the presence of bisulfite, drying may be readily effected in the sun or by air of normal temperature, without fear of souring or blackening or other fermentation or enzymic actions. Where the enzym-retarding body, such as bisulfite, is absent, drying must be relatively rapid and occur soon after comminution. The temperature of the material being dried should be below the gelatinizing point of starch; that it, should not at a maximum go over 60° or 70° C. Air of a temperature considerably hotter than this may be used for drying in the first stages since the development of vapor prevents the starchy material reaching the temperature of the air. As the moisture evaporates, the material becomes less sensitive to heat, and it may be finished relatively warm. However dried, it should be in a completely dry condition, or substantially so. This insures dehydration of immature starch and allows very fine grinding in the next stage. So dried, and particularly in the presence of the bisulfite, the material will store indefinitely or ship any distance. The dry material is next ground to a fine flour or meal in any suitable type of mill or machine. The finer the grinding, ordinarily, the better are the results. The fine ground material is now treated with water, which may have a little sulfur dioxid or bisulfite added to it, and a starchy liquid or magma formed. This liquid is then sieved and the resulting starch milk treated on tables in the usual way to recover starch.

Useful effects of the intermediate drying operation are evinced when the sulfite is not used; but for the stated reasons it is very advantageous to combine the sulfite treatment with the drying as it tends to increase the yield of starch and give a better colored starch.

The effluent from the starch table may be, as stated, filtered and evaporated to a syrup, such syrup being if desired united with the fibrous matter left in the sieves and the two dried down together.

The bisulfite operates effectually to restrain enzymic activity during and after the comminuting operation; and the residual bisulfite remaining in the dry preparation after desiccation operates in the same manner after the regrinding when the material is once more wetted in making the starch milk. Drying at low temperatures, such as must be used in the present invention does not destroy enzymic activity altogether and such activity may be resumed when the material is once more wetted to make the starch milk. The presence of the bisulfite operates to prevent this resumption of activity.

Though the present invention is more particularly adapted to succulent farinaceous vegetable materials, such as starchy tubers and roots, like potatoes, sweet potatoes, cassava, yams, etc., and starchy fruits, such as bananas, bread-fruit, etc., it may also be used in suitably modified form for grains, such as corn, rice, wheat, barley, etc. The grains having ordinarily been dried more or less do not contain immature, light forms of starch to the same extent as undried succulent vegetable materials but the present process nevertheless gives important increases in yield of starch; increases which are important enough to cover the extra cost of redrying after a steeping operation.

In modifying the present process for application to a grain, such as rice, corn, etc., the grain is first steeped in the usual way with the usual steep liquids, being disintegrated before or after the steeping operation. The moist material is then sharp dried at a low temperature and fine ground like the dried succulent vegetable material. The fine ground material is then used in obtaining a starch milk and starch recovered from this milk on the tables or in centrifugals.

My process may also be applied to certain residues left in the ordinary methods of making starch from succulent vegetable materials, such as potatoes, cassava, etc. Where potatoes are wet-ground to form a magma and this strained on the sieves to form starch milk it often happens that about only two thirds of the starch can be recovered on the tables, the other third remaining with the fragmentary potato material residues on the sieves. These residues are customarily merely used for feed stuffs. I find however that I can recover most of this starch by drying the residues to a brittle hardness, fine grinding as described, forming starch milk and recovering the starch on the tables.

Certain of the matter in the present case occurs also in my copending application Serial No. 666,161, filed December 16, 1911, relating to and claiming specifically the treatment of potatoes for the recovery of starch, etc., therefrom. The present case claims broadly the process of No. 666,161 as applied to any succulent vegetable material and claims such process specifically as applied to cassava.

What I claim is:—

1. In the manufacture of valuable products from succulent vegetable materials, the process which comprises roughly comminuting such materials, drying to substantial desiccation at temperatures below the hydrolyzing point of starch, dry grinding the desiccated materials, adding water, re-grinding to secure more complete separation of starch granules from cellular matter, and recovering starch from the resulting mixture.

2. In the manufacture of valuable products from succulent vegetable materials, the process which comprises roughly comminuting such materials, drying to substantial desiccation at temperatures below the hydrolyzing point of starch, dry grinding to a fineness of at least 80 mesh, and recovering starch by wet methods.

3. In the manufacture of valuable products from succulent vegetable materials, the process which comprises roughly comminuting such materials, drying to substantial desiccation, grinding the desiccated materials, adding water, re-grinding to secure more complete separation of starch granules from mixture.

4. In the manufacture of valuable products from succulent vegetable materials, the process which comprises roughly comminuting such materials, drying to substantial desiccation at temperatures below the hydrolyzing point of starch, dry grinding the desiccated materials, wet grinding the finely ground product, obtaining a starch milk from the resulting starchy magma, and treating said starch milk to obtain starch therefrom.

5. In the manufacture of valuable products from a succulent starch-yielding vegetable material, the process which comprises desiccating the said vegetable material to obtain a product containing all the solid matter thereof, fine-grinding such product while dry, treating with liquid to obtain starch milk, and recovering starch therefrom.

6. In the manufacture of valuable products from a succulent starch-yielding vegetable material, the process which comprises comminuting the said vegetable material, desiccating the comminuted mass as a whole, grinding while dry, treating with liquid to obtain starch milk, and recovering starch therefrom.

7. In the manufacture of valuable products from a succulent starch-yielding vegetable material, the process which comprises desiccating the said vegetable material in the presence of an enzym-arresting agent to obtain a product containing all the solid matters thereof, grinding such product while dry, treating with liquid to obtain starch milk, and recovering starch therefrom.

8. In the manufacture of valuable products from a succulent starch-yielding vegetable material, the process which comprises comminuting the said vegetable material, desiccating the comminuted mass as a whole in the presence of an enzym-arresting agent, grinding while dry, treating with liquid to obtain starch-milk, and recovering starch therefrom.

9. In the manufacture of valuable products from a succulent starch-yielding vegetable material, the process which comprises desiccating the said vegetable material, grinding while dry, treating with liquid to obtain starch milk, recovering starch therefrom and concentrating the liquid effluent to form a food product.

10. In the manufacture of valuable products from a succulent starch-yielding vegetable material, the process which comprises comminuting the said vegetable material, desiccating the comminuted mass, grinding while dry, treating with liquid to obtain starch milk, recovering starch therefrom and concentrating the liquid effluent to form a food product.

11. In the manufacture of valuable products from cassava, the process which comprises desiccating cassava, dry-grinding the desiccated material, treating with liquid to obtain starch milk and recovering starch therefrom.

12. In the manufacture of valuable products from cassava, the process which comprises desiccating cassava, dry-grinding the desiccated material to about 100 mesh, treating with liquid to obtain starch milk and recovering starch therefrom.

In testimony whereof, I affix my signature in the presence of two subscribing witnesses.

CHARLES C. MOORE.

Witnesses:
K. P. McElroy,
R. F. Steward.